(12) United States Patent
Cheng et al.

(10) Patent No.: US 9,630,183 B2
(45) Date of Patent: Apr. 25, 2017

(54) ELECTROWETTING ON DIELECTRIC USING GRAPHENE

(71) Applicants: Mark Ming-Cheng Cheng, Novi, MI (US); Xuebin Tan, Troy, MI (US); Zhixian Zhou, Troy, MI (US)

(72) Inventors: Mark Ming-Cheng Cheng, Novi, MI (US); Xuebin Tan, Troy, MI (US); Zhixian Zhou, Troy, MI (US)

(73) Assignee: WAYNE STATE UNIVERSITY, Detroit, MI (US)

( * ) Notice: Subject to any disclaimer, the term of this patent is extended or adjusted under 35 U.S.C. 154(b) by 442 days.

(21) Appl. No.: 14/376,211

(22) PCT Filed: Feb. 1, 2013

(86) PCT No.: PCT/US2013/024377
§ 371 (c)(1),
(2) Date: Aug. 1, 2014

(87) PCT Pub. No.: WO2013/116675
PCT Pub. Date: Aug. 8, 2013

(65) Prior Publication Data
US 2015/0008123 A1    Jan. 8, 2015

Related U.S. Application Data

(60) Provisional application No. 61/593,603, filed on Feb. 1, 2012.

(51) Int. Cl.
*G01N 27/447* (2006.01)
*B01L 99/00* (2010.01)
(Continued)

(52) U.S. Cl.
CPC ......... *B01L 99/00* (2013.01); *B01L 3/502784* (2013.01); *B03C 5/02* (2013.01);
(Continued)

(58) Field of Classification Search
CPC .. B01L 3/502784–3/502792; B01L 2400/0427
See application file for complete search history.

(56) References Cited

U.S. PATENT DOCUMENTS

| 2007/0170059 A1 | 7/2007 | Lee et al. |
| 2008/0169197 A1 | 7/2008 | McRuer et al. |

(Continued)

FOREIGN PATENT DOCUMENTS

WO    2011/115891 A2    9/2011

OTHER PUBLICATIONS

Hu et al., "Electrowetting devices with transparent single-walled carbon nanotube electrodes", Applied Physics Letters 90, 0093124 (2007).*

(Continued)

*Primary Examiner* — Alexander Noguerola
(74) *Attorney, Agent, or Firm* — Brinks Gilson & Lione

(57) ABSTRACT

An electrowetting device and a method of electrowetting may be provided. An electrode may be provided. The electrode has a graphene layer having a first side and a second side that opposes the first side. The electrode also has a dielectric layer disposed on the first side of the graphene layer. A liquid droplet is disposed on the dielectric layer. A voltage is applied through the droplet and the electrode. A contact angle between the dielectric layer and an edge of the liquid droplet contacting the dielectric layer changes in response to the applied voltage.

23 Claims, 8 Drawing Sheets

(51) Int. Cl.
  B01L 3/00  (2006.01)
  B03C 5/02  (2006.01)
  H01G 11/32 (2013.01)
  G02B 26/00 (2006.01)

(52) U.S. Cl.
  CPC ........... *G02B 26/005* (2013.01); *H01G 11/32* (2013.01); *B01L 2400/0427* (2013.01); *Y02E 60/13* (2013.01)

(56) References Cited

U.S. PATENT DOCUMENTS

| | | |
|---|---|---|
| 2009/0114883 A1 | 5/2009 | Collier et al. |
| 2009/0169819 A1 | 7/2009 | Drzaic et al. |
| 2010/0140093 A1 | 6/2010 | Pamula et al. |

OTHER PUBLICATIONS

McEuen et al. "Single-walled Carbon Nanotube Electronics", IEEE Transactions on Nanotechnology, vol. 1, No. 1, Mar. 2002, pp. 78-84.*

Odom et al., "Single-Walled Carbon Nanotues: From Fundamental Studies to New Device Concepts," Ann. N.Y. Acad. Sci. 960: 203-215 (2002).*

United States Patent and Trademark Office, International Search Report of PCT/US2013/024377, Mailed on Apr. 11, 2013, 1 page.

\* cited by examiner

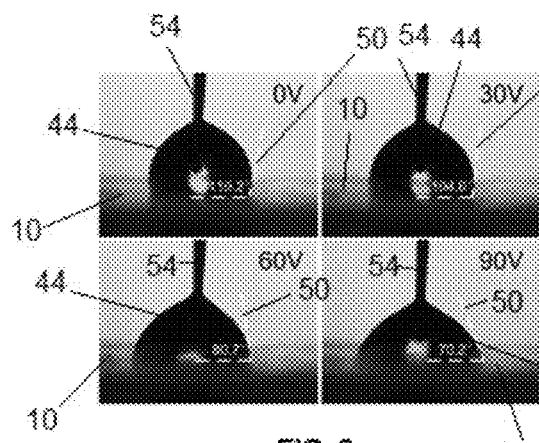
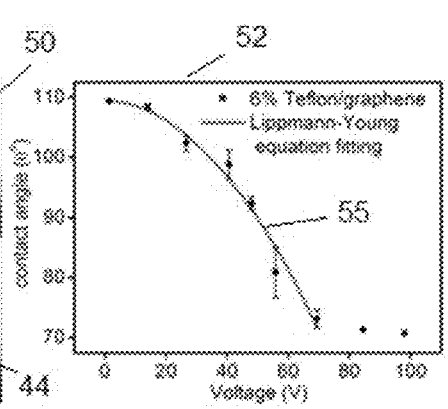
FIG. 6      FIG. 7
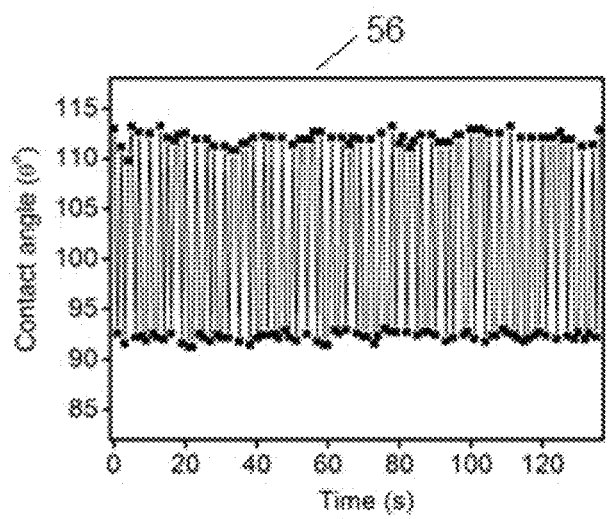
FIG. 8

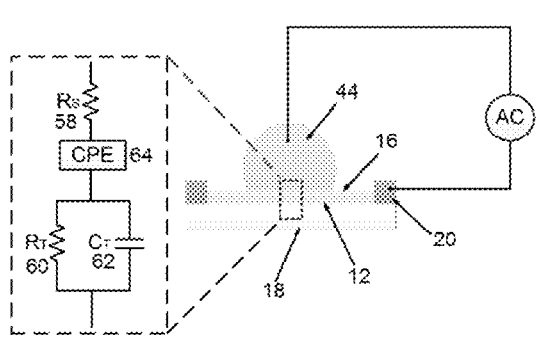
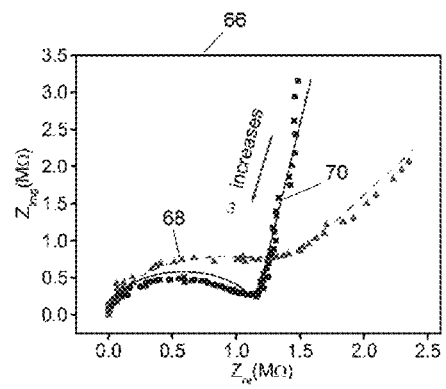
FIG. 9
FIG. 10
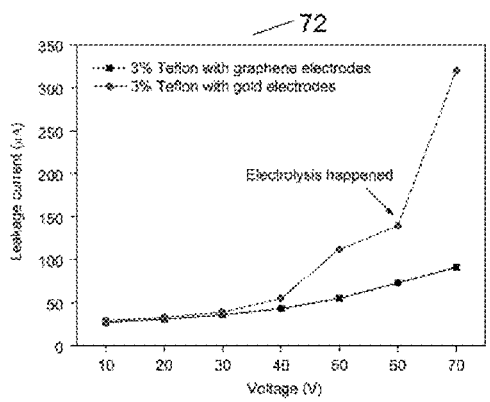
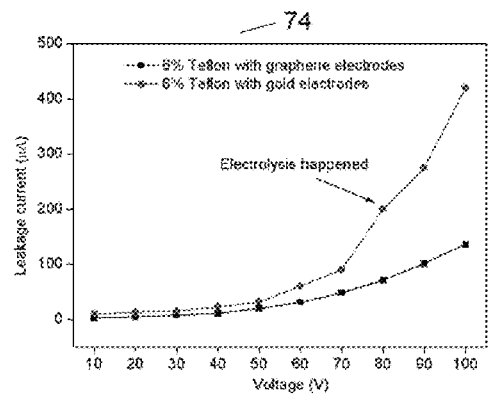
FIG. 11
FIG. 12
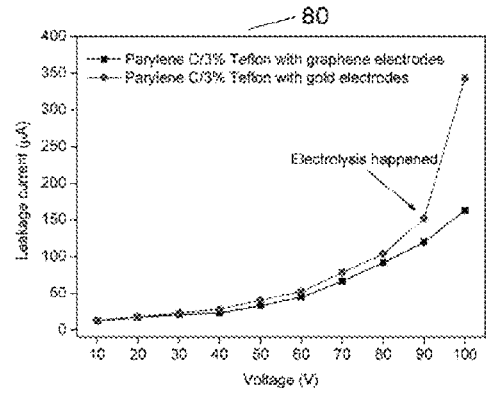
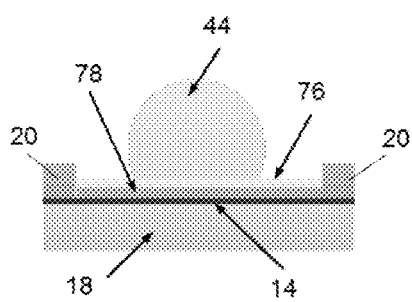
FIG. 14
FIG. 13

ELECTROWETTING ON DIELECTRIC USING GRAPHENE

CROSS REFERENCE TO RELATED APPLICATIONS

This application is a §371 national stage application of International Application No. PCT/US2013/024377 filed on Feb. 1, 2013, which claims priority to U.S. Provisional Application No. 61/593,603 filed on Feb. 1, 2012, the entire contents of which are hereby incorporated by reference.

BACKGROUND

The present disclosure generally relates to microfluidics. More specifically, the present disclosure relates to electrowetting on dielectrics (EWOD).

SUMMARY

In overcoming the drawbacks and other limitations of the related art, the present disclosure may generally provide an electrowetting device and a method for electrowetting on a dielectric (EWOD). The electrowetting device may include an electrode comprised of graphene sheets synthesized by chemical vapor deposition (CVD) and coated with a dielectric, for example a hydrophobic dielectric such as Teflon and/or Parylene C. The electrode may be transferred to various substrates, including glass slides and polyethylene terephthalate (PET) films. Embodiments of the present disclosure may provide reversible changes of a contact angle between the dielectric layer and an edge of a conductive liquid droplet contacting the dielectric layer during EWOD, even at high AC or DC voltages that cause irreversible changes in other electrodes such as Teflon/gold electrodes. Additionally, the Teflon/graphene electrode may have a higher capacitive impedance than a Teflon/gold electrodes under otherwise identical conditions. This is because the Teflon/graphene electrode may have a lower density of pin-holes and defects than in the Teflon/gold electrode. Furthermore, there may be reduced electrolysis of the electrolyte, and a smaller leakage current in the Teflon dielectric layer on graphene electrodes than on gold electrodes at the same Teflon thickness and applied voltage. The improved EWOD properties using graphene as an electrode material may enable various devices for optical and biological applications, including flexible displays and droplet manipulation in three-dimensional microfluidics.

In some embodiments, the present disclosure may relate to a method of electrowetting. The method may include providing an electrode. The electrode include a graphene layer having a first side and a second side. The second side may oppose the first side. The electrode may include a dielectric layer disposed on the first side of the graphene layer. The method may include providing a liquid droplet on the dielectric layer. The method may include applying a voltage through the droplet and the electrode, wherein a contact angle between the dielectric layer and an edge of the liquid droplet contacting the dielectric layer changes in response to the applied voltage.

In some embodiments, the present disclosure may relate to an electrowetting device. The electrowetting device may include an electrode. The electrode may include a graphene layer having a first side and a second side that opposes the first side. The electrode may include a dielectric layer disposed on the first side of the graphene layer. The dielectric layer may be configured to allow a liquid droplet to be disposed thereon. The electrowetting device may be configured to cause a change in a contact angle between the dielectric layer and an edge of the liquid droplet contacting the dielectric layer in response to a voltage applied through the droplet and the electrode.

In some embodiments, the present disclosure may relate to an electrowetting device. The electrowetting device may include a first graphene electrode having a first side and a second side that opposes the first side. The electrowetting device may include a second graphene electrode having a first side and a second side that opposes the first side. The second graphene electrode may be being spaced apart from the first graphene electrode. The electrowetting device may include a dielectric layer disposed on the first sides of the first and second graphene electrodes. The dielectric layer may be configured to allow a liquid droplet to be disposed thereon. The electrowetting device may be configured to cause a change in a contact angle between the dielectric layer and an edge of the liquid droplet contacting the dielectric layer in response to a voltage applied through the droplet and one or both of the first or second electrodes.

Further features and advantages of the present disclosure will become apparent from consideration of the following description and the appended claims when taken in connection with the accompanying drawings. It should be understood that the description and specific examples are intended for purposes of illustration only and are not intended to limit the scope of the present disclosure.

BRIEF DESCRIPTION OF THE DRAWINGS

FIG. 6 illustrates a side view of changes in a contact angle of a droplet on the EWOD device in response to applied AC voltages in accordance with the principles of the present disclosure;

FIG. 7 Illustrates a graph showing the changes in a contact angle of droplets in response to applied AC voltages in accordance with the principles of the present disclosure;

FIG. 8 illustrates a graph showing the cyclability of the contact angles of a droplet in accordance with the principles of the present disclosure;

FIG. 9 illustrates a schematic view of an equivalent circuit model for an EWOD device;

FIG. 10 illustrates a graph 66 showing Nyquist plots which demonstrate that the circuit may be cataloged by two different regions depending on the frequency of the AC voltages;

FIG. 11 illustrates a graph showing leakage current measurements of an EWOD device with thin Teflon coatings on gold vs. graphene electrodes in accordance with the principles of the present disclosure;

FIG. 12 illustrates a graph showing leakage current measurements of an EWOD device with a thick Teflon layer on gold vs. graphene electrodes in accordance with the principles of the present disclosure;

FIG. 13 illustrates a schematic view of an EWOD device in accordance with the principles of the present disclosure;

FIG. 14 illustrates a graph showing leakage current measurements of an EWOD device with a Parylene C pinhole-free dielectric layer with thin Teflon coatings on gold vs. graphene electrodes in accordance with the principles of the present disclosure;

Figures 1, 2:
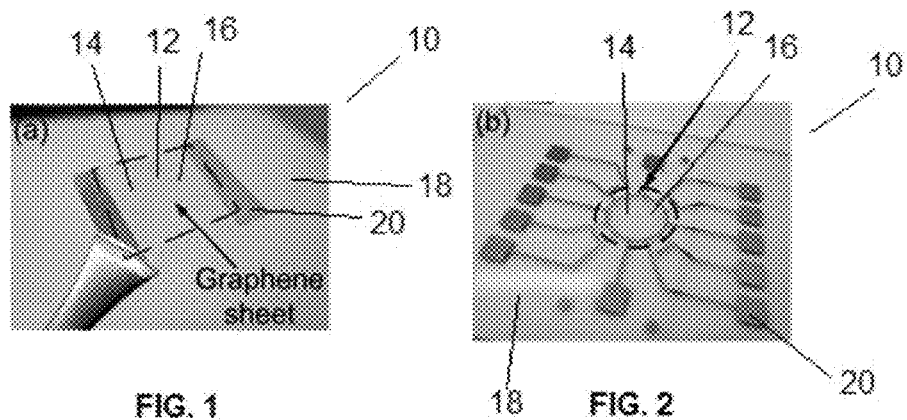
FIG. 1 is a perspective view of an EWOD device in accordance with the principles of the present disclosure.
FIG. 2 is a perspective view of an EWOD device in accordance with the principles of the present disclosure.

The drawings described herein are for illustration purposes only and are not intended to limit the scope of the present disclosure in any way.

DETAILED DESCRIPTION

The terms "substantially" or "about" used herein with reference to a quantity include variations in the recited quantity that are equivalent to the quantity recited, such as an amount that is equivalent to the quantity recited for an intended purpose or function.

During EWOD, a conductive liquid droplet may be provided on a dielectric layer, and an AC or DC voltage may be applied (and varied) between the liquid droplet and the electrode to control (e.g., change, increase, decrease) a contact angle between the dielectric layer of the electrode and an edge of the liquid droplet contacting the dielectric layer. The change in contact angle in response to the applied voltage may be described, or substantially described, by the Lippmann-Young equation $$\cos\theta = \cos\theta_0 + \frac{CV^2}{2\gamma} \quad (1)$$

where $\theta$ may be the contact angle of the liquid droplet with the applied voltage, $\theta_0$ may be the initial contact angle, $\gamma$ may be the surface tension of the liquid-vapor interface, $C$ may be the capacitance of the dielectric layer per area, and $V$ may be the applied voltage. In EWOD, the capacitance per unit area is determined by $$\frac{\varepsilon_0 \varepsilon}{t},$$

where $\varepsilon$ may be the relative dielectric constant (which may be equal to the absolute dielectric constant divided by the permittivity of free space), $t$ may be the thickness of the dielectric layer, and $\varepsilon_0$ may be the permittivity of free space. Because of the presence of an insulating dielectric layer, a large voltage can be applied between the conductive droplet and the electrode without electrolysis.

The advantages of EWOD may include (1) reversible and robust control of contact angles, (2) more types of liquids that can be manipulated because of the hydrophobic surface coating of dielectric layers (typically fluoropolymer). Therefore, EWOD may be applied in various applications, including digital microfluidics, optics, displays, and analysis of biological samples. EWOD devices may be planar, and the electrode materials used in EWOD may be metals (e.g. gold, platinum, copper), semiconductors (e.g. silicon, carbon nanotubes), and/or ceramics (ITO). ITO, at a thickness of 310 nm thick, has a 85% optical transparency in the visible light range. However, ITO is brittle, lacks flexibility, and its price has increased dramatically in recent years. Gold is more flexible than ITO, but is expensive and optically opaque. None of these electrode materials can achieve both high optical transparency and mechanical flexibility, each of which are important to a number of applications, including optical and biological applications.

Graphene has not previously been investigated for and can replace ITO and gold in three-dimensional manipulation of droplets and EWOD. Graphene is a transparent, highly flexible, stretchable nanomaterial that is made of a single layer crystal lattice of $sp^2$ carbon atoms. Graphene may have various outstanding physical, electrical, and electrochemical properties, including extremely high charge carrier mobility and excellent in-plain conductivity at room temperature. Graphene may be used as a transparent conducting electrode material due to its frequency-independent high optical transmission (97.7%) and mechanically flexible/stretchable properties. Graphene thin films can achieve better optical transmission (>90%) than ITO with a similar resistance (e.g. $R_s=20\Omega$). Table 1 below summarizes the properties of gold, ITO, and graphene. In Table 1, the optical transmission uses 550 nm wavelength as reference.

TABLE 1

|  | Gold | ITO | Graphene |
| --- | --- | --- | --- |
| Optical transmission (%) | <20 (180 nm) | 85 (310 nm) | 97.7 (<1 nm) |
| Youngs' modulus (GPa) | 80 | 116 | 500 |
| Yield strength (MPa) | 55~200 | 1200 | $1.3 \times 10^5$ |
| Electrical conductivity (S/cm) | $4.52 \times 10^5$ | $1 \times 10^4$ | $9.6 \times 10^5$ |

FIGS. 1 and 2 illustrate perspective views of EWOD devices 10 that may each have an electrode 12 comprised of a graphene sheet 14 and a dielectric layer 16. The EWOD devices 10 may also each have a substrate 18 and contact pads 20. The dielectric layer 16 be disposed (e.g. attached) on a side of the graphene layer 14 that opposes the side on which the substrate 18 is disposed (e.g. attached). In FIG. 1, the substrate 18 may be a PET film, and two rectangular contact pads 20 disposed (e.g. attached) at the ends of the EWOD device 10. The contact pads 20 may be attached to one or both of the graphene sheet 14 and the dielectric layer 16. In FIG. 2, the substrate 18 may be a glass slide, and twelve rectangular (e.g. square) contact pads 20 spaced around the center of the EWOD device 10 and attached to one or both of the graphene sheet 14 and the dielectric layer 16, wherein each contact pad 20 has an electrical path of the same material as the contact pads 20 meeting at a circular electrical path.

Figure 3:
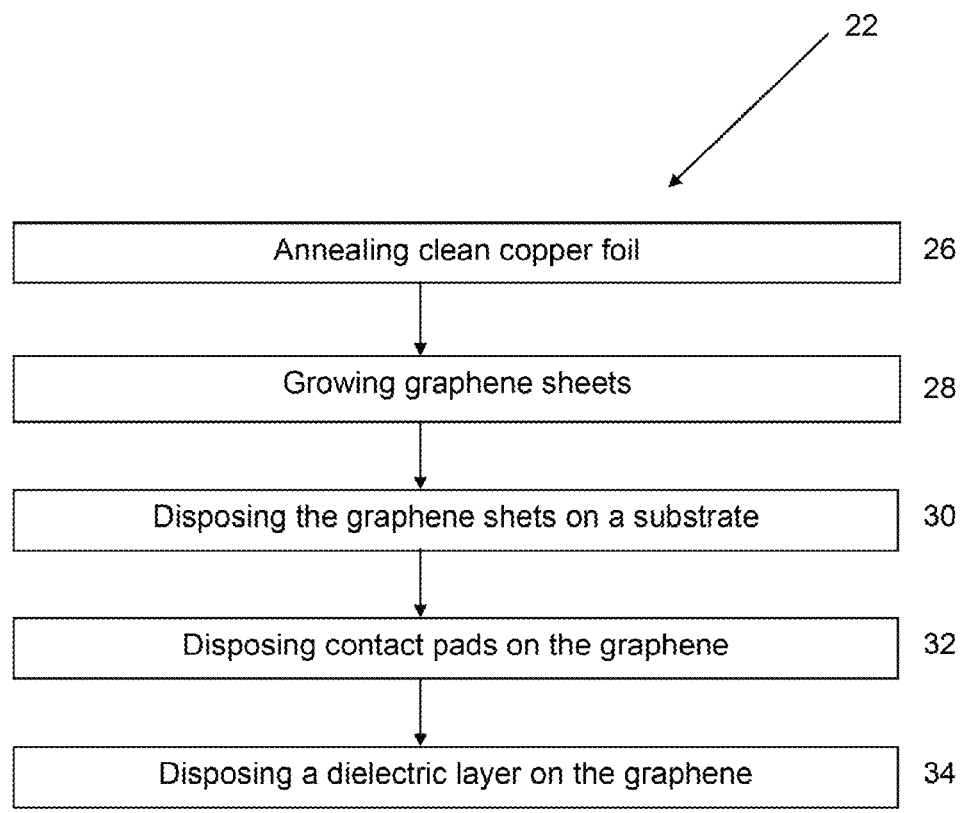
FIG. 3 is a flowchart of a method of forming an EWOD device in accordance with the principles of the present disclosure.

FIG. 3 illustrates a method 22 of forming (e.g. fabricating) an EWOD device 10. The method may include growing graphene sheets 14 using CVD. At block 26, the copper (e.g. a clean copper foil such as those provided by Alfa Aesar) may be annealed for 2 hours while flowing an $H_2$ gas at a rate of 3 sccm and a pressure around 40 mTorr at 1000° C.

At block 28, graphene may be grown by flowing a mixture of 30 sccm $CH_4$ and 2 sccm $H_2$ gases into the chamber for 30 minutes at 1000° C. The pressure may be controlled at about 500 mTorr. Thus, the $CH_4$ gas may be thermally decomposed on copper to form the graphene sheets 14.

At block 30, after growth, the graphene sheets 14 may be disposed onto (e.g. transferred onto, or attached onto) a substrate 18. For example, a thin layer of PMMA 495 (e.g. such as that provided by MicroChem) may be spin-coated (e.g. at 3000 rpm) on the graphene 14 side of the copper foil, and may be dried at room temperature for 1 hour. The copper foil may be etched in a 1 M ferric chloride ($FeCl_3$) with the PMMA side facing up. The floating PMMA/graphene sheets 14 may then be carefully scooped out of $FeCl_3$ solution using a piece of silicon substrate and rinsed in deionized (DI) water. To obtain a smooth graphene surface, the silicon substrate may be kept close to the floating PMMA/graphene sheet until the whole sheet may naturally attach to the substrate before removal from the beaker. The graphene/PMMA sheet may be dried for several hours at room temperature. The PMMA layer may then be removed by acetone, and the graphene sheet 14 may be rinsed several times in isopropyl alcohol (IPA). The graphene 14 may then be disposed onto (e.g. transferred onto, or attached onto) a substrate 18, for example a silicon wafer, thermally oxidized silicon wafer, glass slide, or a polyethylene terephthalate (PET) film (e.g. polyester film). Thus, EWOD may be demonstrated on a transparent, curved and three-dimensional substrate 18 such as a PET film. The graphene may be defined using photolithography and oxygen plasma, as will be discussed in more detail with respect to FIGS. 21-26. The low optical contrast of graphene on the transparent glass may be attributed to the lack of interference between glass and graphene as well as the high optical transmission rate of graphene. As the glass transient temperature of PET films may be less than 200° C., high temperature annealing during device fabrication, which has been often used in literature to remove the PMMA residue.

At block 32, for external electrical contact, one or more contact pads 20, made of e.g. chromium and gold (e.g. 5 nm Cr/50 nm Au), may be disposed on (e.g. deposited on, or attached on) the graphene using electron beam evaporation through a shadow mask made of stainless steel. Using Cr/Au for the contact pads 20 may be helpful because to make the contact pads 20 visible and harder, so that the contact pads 20 can be located and attached to electrodes and electrical paths.

At block 34, a dielectric layer 16 may be disposed (e.g. attached) on the graphene 14 to form an electrode 12. For example, a Teflon dielectric layer (e.g. Teflon, such as DuPont AF 1600 1%~6% diluted in 3M FC 72) may be spin coated on top of the graphene at 3000 rpm and baked at 165° C. for 2 hours. The thickness of the Teflon may be measured by both an ellipsometry and a surface profiler. The average thickness of a 6% Teflon spin-coated (3000 rpm) device may be 1.2 μm±0.2 μm, as measured by ellipsometry. The surface profile of spin-coated Teflon may show 15% to 20% thickness variations within the scanning range of 3 mm.

Figure 4:
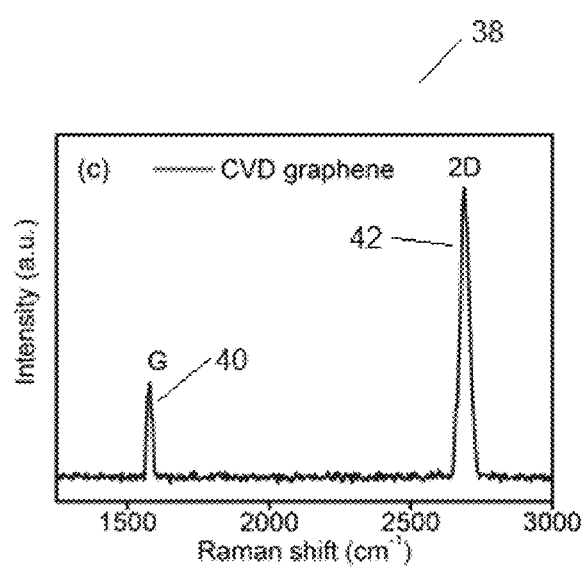
FIG. 4 illustrates a graph showing Raman spectra of the graphene of FIGS. 1 and 2.

FIG. 4 illustrates a graph 38 showing Raman spectra of the graphene 14 of FIGS. 1 and 2. A relative intensity ratio of $$\frac{I_G}{I_{2D}} \approx 0.4$$

between the G band 40 (~1590 cm$^{-1}$) and the 2D band 42 (~2670 cm$^{-1}$) along with the shape of the 2D peak 42 indicates that the graphene sample 14 may have a single layer. The absence of D band (~1350 cm$^{-1}$) may indicate low disorder and high quality of our graphene 14. The Raman spectroscopy of the CVD graphene 14 deposited on various of substrates may be measured by a Raman system consisting of a Jobin-Yvon Horiba Triax 550 spectrometer, a liquid-nitrogen cooled charge-coupled device (CCD) detector, Olympus model BX41 microscope with a 100× objective, and a 514.5 nm Modu-Laser (Stellar-Pro-L) Argon-ion laser. The Raman-scattered light from the sample may be collected by the same microscope objective and may be focused on the entrance slit of the spectrometer with a 1200 line/mm diffraction grating. The data may be recorded and analyzed using the LabSpec software.

Figure 5:
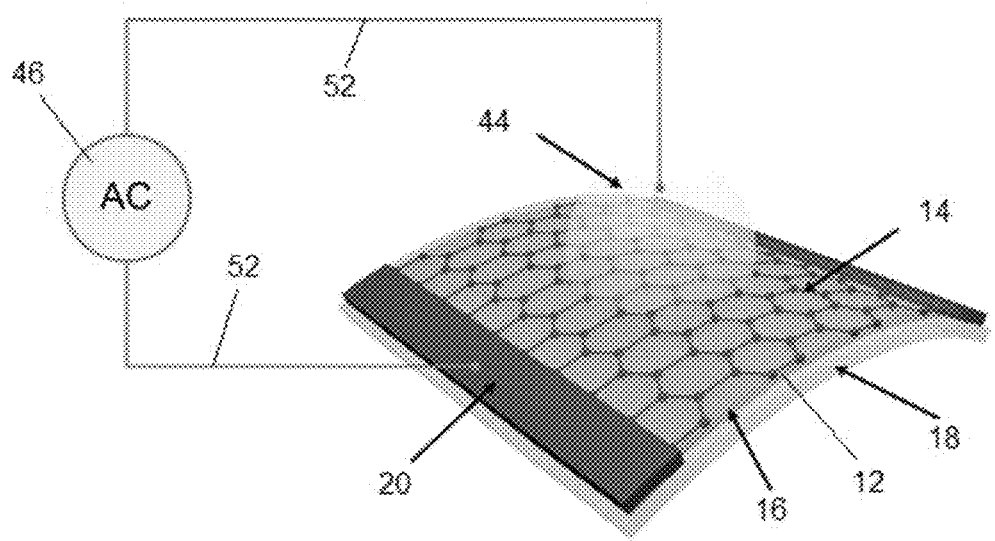
FIG. 5 illustrates a schematic view of an EWOD device 10 in accordance with the principles of the present disclosure.

FIG. 5 illustrates a schematic view of an EWOD device 10 that may have an electrode 12 comprised of a graphene sheet 14 and a dielectric layer 16. The EWOD device 10 may also have a substrate 18 and contact pads 20. A liquid droplet 44 (e.g. an aqueous electrolyte droplet such as potassium chloride) may be disposed (e.g. attached) on the dielectric layer 16. An AC power source 46 may form an electrical circuit with the liquid droplet 44 and electrode 12 though electrical path 48.

FIG. 6 illustrates the side view of changes in a contact angle 50 of a droplet 44 on the EWOD device 10 in response to no applied AC voltage, and applied AC voltages of 30 V, 60 V, and 90 V. FIG. 7 Illustrates a graph 52 showing the changes in a contact angle 50 of droplets (e.g. KCl, 3 μL, 10 mM) in response to AC voltages (1 kHz) from 0 V to 100 V. The voltage may be applied between an electrode 12 comprising graphene 14 coated with a Teflon dielectric 16, and a tungsten probe 54 that may be inserted into the droplet 44 as part of the electrical path 48. The contact angle 50 measurement may be performed on a home-built optical system consisting of a Navitar 12× zoom lens, a white light semi-flexible fiber optical source and a USB CCD camera (iSolution). The samples may be placed on a three-axis stage while a Labview module used to control a function generator (e.g. Agilent 33120A) and an AC power amplifier. The CCD camera may be programmed using the Labview software to record movies with a maximum frame rate of 60 fps. The system may be capable of generating AC voltages from 0 V to 100 V with a frequency between 10 Hz and 10 KHz, for example.

An initial contact angle of the KCl droplet 44 placed on a 1 μm Teflon dielectric layer 16 (6% in FC72) may be 109.5°±1° at 0 V, as may be determined by a droplet analysis tool of the ImageJ software. The contact angle of the droplet may decrease to 70.2°±1° as the voltage increases to 90 V, but without any electrolysis in the droplet 44. The voltage dependence on the contact angle may be well described by the equation (1) as shown in FIG. 7 (the solid line 55 is the theoretical fit). The fitting parameters may be: $\theta_0=109.45°$, surface tension $\gamma=72.7$ dyn/cm, relative dielectric constant for Teflon layer $\in=2.1$, the thickness of the Teflon layer $t=0.96$ μm and $\in_0=8.85\times10^{-12}$ F/m. The unit capacitance may be extracted from the fit ($6.08\times10^{-11}$ F), and is in good agreement with that calculated using a double-plate capacitance model ($5.8\times10^{-11}$ F, assuming $\gamma=72.7$ dyn/cm, $\in=2.1$, and the thickness of the Teflon layer t=0.96 µm). The variance of the contact angles 50 from the theoretical fit may be due to rough surfaces of Teflon coatings 16. As the voltage may be increased beyond 90 V, no further decrease of the contact angle 50 may be observed. This may be attributed to the instability of the applied electrical field where the high density of charge carrier is injected into the insulator, a phenomenon known as contact angle saturation. The dielectric Teflon layer is still stable on graphene 14 even at 160 V, and the initial value of the contact angle 50 of the droplet 44 at 0 V is instantaneously restored when the applied voltage is turned off, suggesting high durability and reversibility of the Teflon 16 on the graphene structure 12. Similar contact angle 50 changes to those described above occur with applied DC voltages instead of AC voltages. The contact angle 50 changes and the change range may vary depending on the thickness of the Teflon dielectric layer 16.

The reversibility of electrowetting on graphene may be tested with two different Teflon (1% and 3%) thicknesses using a Labview controlled power amplifier. FIG. 8 illustrates a graph 56 showing the cyclability of the contact angles 50 of a droplet 44 on the thicker Teflon layer 16 (3% in FC 72; 550 nm to 750 nm) coated on graphene 14 when an AC voltage (1 kHz) is switched between 15.3 and 46.9 V. The result shows that the contact angles 50 change reversibly between 112° and 92° for more than 50 cycles, and may indefinitely continue to change reversibly. On the thinner Teflon layer 16 (1% in FC 72, less than 100 nm), the AC voltage (1 kHz) applied to a 3 µL KCl droplet 44 is switched between 15 V and 36 V every 1 second. The result shows reversible electrowetting with the contact angle 50 switching between 115° (at 15 V) and 95° (at 36 V). The excellent cyclability of the reversible electrowetting demonstrated by Teflon coated graphene electrodes 12 may be attributed to the higher chemical and mechanical stability of graphene 14 compared to other commonly used electrode materials. The reversible electrowetting is reproducible using both AC and DC voltages.

Teflon-coated graphene electrodes 12 may also exhibit superior AC impedance properties. For example, the AC impedance of graphene and gold electrodes using the same Teflon coating condition (6% in FC72) is described below. Electrochemical impedance measurement is a common technique to understand an electrochemical system. Critical parameters can be extracted by this method, including the capacitance and leakage resistance of Teflon 16, the double layer capacitor between electrolytes (e.g. liquid droplet 44) and solid, and electrolyte resistance. The AC impedance measurement may be carried out using a PARSTAT 2273 advanced electrochemical system (such as that provided by Princeton Applied Research), for example using the EWOD device 10, droplet 44, AC power source 46, and electrical path 48 of FIG. 5. The working electrode of the potentiostat may be connected to the tungsten probe 54 (e.g. W1000-1605R by Rucker & Kolls), which is shown for example in FIG. 6 and which may be inserted in a droplet 44 deposited on the dielectric surface 16, while the counter and reference electrodes may be connected to the graphene electrode 12. The amplitude of the AC voltage may be 0.1 mV. The frequency may be swept from 0.1 Hz to 100 kHz. All the measurements may be performed under ambient atmosphere conditions at room temperature inside a Faraday cage (in order to minimize electromagnetic noises). Nyquist plots may be recorded with the x and y axes respectively as the real part and imaginary part of the device impedance. The leakage currents may be measured by a digital multimeter (e.g. Agilent 34401A). Additional 1 µm Parylene C dielectric layer 16 may be deposited by a Parylene deposition system (e.g. the Labcoater 2 SCS PDS2010, Specialty Coating Systems).

FIG. 9 illustrates a schematic view of an equivalent circuit model for the EWOD device 10 that may have an electrode 12 comprised of a graphene sheet 14 and a Teflon dielectric layer 16. The EWOD device 10 may also have a glass film substrate 18 and Cr/Au contact pads 20. A liquid droplet 44 may be disposed on the dielectric layer 16. An AC power source 46 may form an electrical circuit with the liquid droplet 44 and electrode 12 though electrical path 48. $R_S$ may be the electrolyte resistance 58, $R_T$ and $C_T$ may be the resistance 60 and the capacitance 62 of the Teflon layer 16, and CPE is the constant phase element 64 (CPE) associated with the double layer of the electrolyte/Teflon interface. FIG. 10 illustrates a graph 66 showing Nyquist plots which demonstrate that the circuit may be cataloged by two different regions depending on the frequency of the AC voltages. At high frequency (100 kHz to 100 Hz), the CPE 64 may be negligible, and $R_S$ in series with $R_T//C_T$ may dominate the impedance. The circuit response 68 is shown as the depressed semi-circles ($Z_{img}$ 0~1 MΩ and $Z_{re}$ 0-1.2 MΩ) next to the origin of the plot, and may represent high frequency responses. By fitting impedance data to this model, as shown in Table 2 below, $R_S$ may be shown to be approximately 2000Ω and $R_T$ may be shown to be about $1.08\times10^6\Omega$ to $1.15\times10^6\Omega$. The capacitances of the Teflon layer $C_T$ on graphene 14 and gold electrodes may be $3.8\times10^{-11}$ F and $4.58\times10^{-11}$ F respectively. These values are consistent with the theoretical capacitance $$C = \frac{\varepsilon_0 \varepsilon A}{t}$$

assuming a Teflon thickness of 1 µm±0.2 µm and droplet size of 3 µL (from $5.8\times10^{-11}$ F to $4.14\times10^{-11}$ F). At low frequencies (f<100 Hz), the circuit may be dominated by the double layer capacitor of solid/electrolytes. The double layer capacitor may not be an ideal capacitor because of presence of pin-holes and rough surfaces of electrodes. The circuit response 70 may be represented by a straight line connected to the depressed semi-circle. The straight line is modeled by a CPE, which may comprise a distribution of ohmic and capacitive elements that may lead to non-uniform, frequency-dependent resistance and capacitance. By fitting the impedance data, the slopes may be estimated as $\alpha_{Teflon/graphene}=0.91$ and $\alpha_{Teflon/gold}=0.66$. The slope α may give the nature of the impedance properties. For capacitive impedance, α may be close to 1, and for resistive impedance, α may be close to 0. The double layer capacitor of Teflon/gold may be more electrically leaky compared to that of Teflon/graphene. For the same voltage range (0 V to 100 V), the contact angle 50 change on the Teflon coated graphene electrode (~40°) may be larger than that on Teflon coated gold electrode) (~30°) under otherwise identical conditions, suggesting that the Teflon on graphene is slightly thinner than the Teflon on gold. The higher capacitive impedance for the Teflon/graphene electrode system in comparison with the Teflon/gold electrode system may be mainly attributed to the lower density of pores and defects in the Teflon on graphene electrode than in the Teflon on gold electrode.

TABLE 2

| | $R_S$ (Ω) | $R_T$ (Ω) | $C_T$ (F) | CPE | A |
|---|---|---|---|---|---|
| Teflon/Graphene | 2000 | $1.15 \times 10^6$ | $3.8 \times 10^{-11}$ | $7.2 \times 10^{-9}$ | 0.91 |
| Teflon/Gold | 2000 | $1.08 \times 10^6$ | $4.58 \times 10^{-11}$ | $5.6 \times 10^{-9}$ | 0.66 |

The leakage current and the breakdown voltage of dielectric layers of different thicknesses and configurations may be measured. The breakdown voltage may be defined as the minimum voltage which results in an irreversible contact angle 50 changes.

FIG. 11 illustrates a graph 72 showing leakage current measurements of an EWOD device with thin Teflon coatings (3%, 0.55-0.75 μm) on gold vs. graphene electrodes. For the gold electrode, the leakage current jumps significantly from 50 μA to 110 μA with an applied voltage increase from 40V to 50V, and electrolysis occurs at about 60V. FIG. 12 illustrates a graph 74 showing leakage current measurements of an EWOD device with a thicker Teflon layer (6%, 1 μm) on gold vs. graphene electrodes. For the gold electrode, the leakage currents reduce while breakdown voltage slightly increases. Nevertheless, at high voltage (>80V), leakage current dramatically increases for gold electrodes. Severe electrolysis may occur on the gold electrode when the voltage is further increased. However, for graphene electrodes in both FIGS. 11 and 12, leakage current does not dramatically increase as applied voltage increases. The leakage current may be less than 200 μA and the breakdown voltage may be larger than 100V in both cases (3% and 6% Teflon).

FIG. 13 illustrates a schematic view of an EWOD device 10 that may have an electrode 12 comprised of a graphene sheet 14 and a dielectric layer 16. The EWOD device 10 may also have a glass film substrate 18 and Cr/Au contact pads 20. A liquid droplet 44 may be disposed on the dielectric layer 16. However, in this embodiment, the dielectric layer 16 may comprise both a Teflon layer 76, and a Parylene C layer 78 having a first side and a second side. The first side of the Parylene C layer 78 may be disposed (e.g. attached) on the dielectric first side of the graphene layer 14, and the second side of the Parylene C layer 78 may be disposed (e.g. attached) on the Teflon layer 76. Including Parylene C 78 may be advantageous because of the Teflon layer's 76 pin-hole surfaces and low dielectric constant. Parylene C has higher a dielectric constant (3.1 at 1000 Hz), and is considered pinhole free with thickness higher than few nanometers. The Parylene C layer may have a thickness of about 1 μm.

FIG. 14 illustrates a graph 80 showing leakage current measurements of an EWOD device with a Parylene C pinhole-free dielectric layer with thin Teflon coatings (3%, 0.55-0.75 μm) on gold vs. graphene electrodes. By having the two-layer stacking of the Parylene C layer 78 coated with a hydrophobic Teflon layer 76, the leakage current may be reduced for both electrodes with Parylene C sandwiched between electrodes and Teflon. However, when the applied voltage is larger than 90 V, the dielectric layer begins to breakdown on the gold electrodes rather than on graphene electrodes. Indeed, by testing the EWOD of Parylene C/Teflon stacking layers on graphene, it may be shown that the breakdown voltage with graphene electrodes is larger than 140V without electrolysis. Thus, graphene electrodes may allow the Teflon coating to possess a higher breakdown voltage compared to gold electrodes. In addition, and the leakage current in the Teflon/graphene devices may also be much smaller than in the Teflon/gold electrode devices. This is likely due to the fact that carbon atoms have a wide potential window in the electrode/electrolyte interface.

Figure 15:
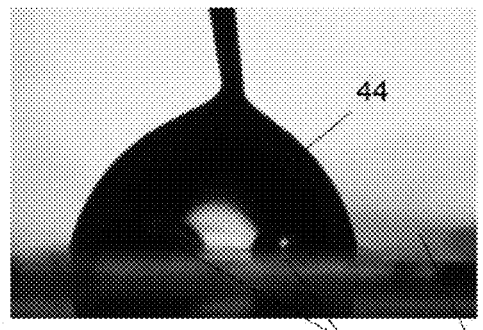
FIG. 15 illustrates a side view of gas bubble generation around Teflon/gold electrodes in accordance with the principles of the present disclosure.
Figure 16:
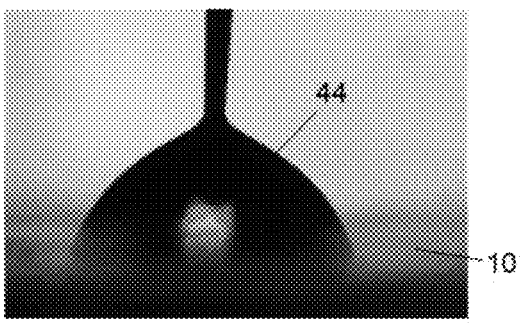
FIG. 16 illustrates a side view of Teflon/graphene electrodes with no bubble generation in accordance with the principles of the present disclosure.

Thus, the Teflon coatings may be more stable on graphene than on gold for EWOD. Unlike gold, whose surfaces are hydrophilic, the surfaces of graphene are hydrophobic. The hydrophobic-hydrophobic interactions between hydrophobic graphene and hydrophobic Teflon may allow Teflon to self-assemble better and provide better adhesion during the coating process. This is further verified by the fact that, under AC 70 V, electrolysis may be less likely to occur at Teflon/graphene electrodes than at Teflon/gold electrodes. FIG. 15 illustrates a side view of gas bubble generation 81 around Teflon/gold electrodes, and FIG. 16 illustrates a side view of Teflon/graphene electrodes with no bubble generation.

Figure 17:
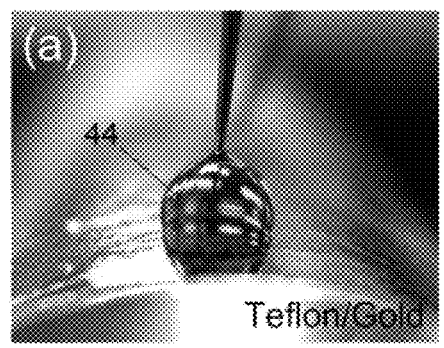
FIG. 17 illustrates perspective views of electrowetting performed on gold electrodes with no voltage applied.
Figure 18:
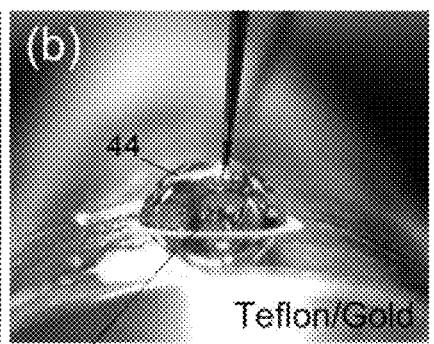
FIG. 18 illustrates perspective views of electrowetting performed on gold electrodes with AC voltage applied.
Figure 19:
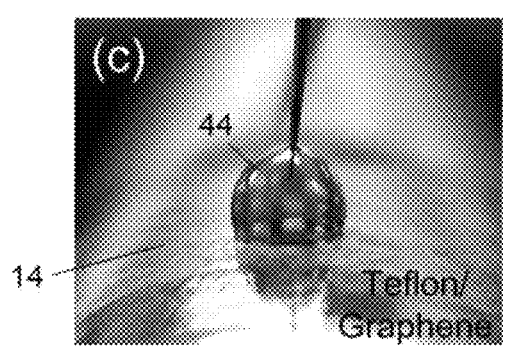
FIG. 19 illustrates perspective views of electrowetting performed on graphene electrodes with no voltage applied.
Figure 20:
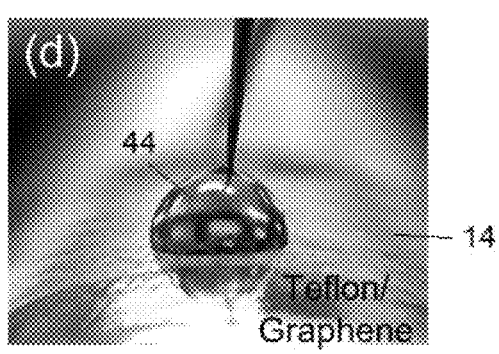
FIG. 20 illustrates perspective views of electrowetting performed on graphene electrodes with AC voltage applied.

Reversible contact angles 50 may also be observed in curved substrates using graphene. FIGS. 17-20 illustrate perspective views of electrowetting performed on gold electrodes (FIGS. 17 and 18) and graphene electrodes (FIGS. 19 and 20) coated with 6% Teflon dielectric layers and deposited on curved PET films as substrates. In FIGS. 17 and 19, no voltage is applied, and in FIGS. 18 and 20, an AC sinusoidal wave with frequency 1 kHz and 60V is applied. The KCl liquid droplet 44 (5 μL 10 mM) shown is colored with food dye, and carefully placed on the curved PET film surface. As the voltage increases, the contact angles on both electrodes decrease. Compared to the gold electrode, the graphene electrode is more stable. There were no bubbles (electrolysis) at a high voltage on Teflon-coated graphene. With a thickness 50 nm, the gold electrode becomes optically non-transparent, and it blocks the light to transmit through a PET film. In addition, bubbles 81 appear with an applied voltage 60V due to water hydrolysis. While the breakdown voltage of a dielectric layer (Teflon) may be increased by its thickness, thick Teflon requires higher driving voltage for EWOD. By contrast, a graphene electrode is optically transparent with no bubbles. Reversible EWOD on graphene may be observed by applying both DC and AC (10 Hz~1 kHz) voltages.

Figure 21:
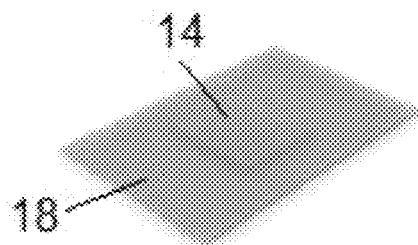
FIGS. 21-26 illustrate perspective views of a fabrication process of an EWOD device having multiple spaced apart graphene electrodes.
Figure 24:
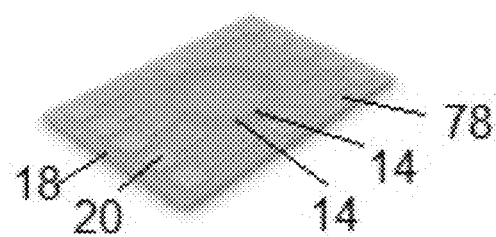
Figure 22:
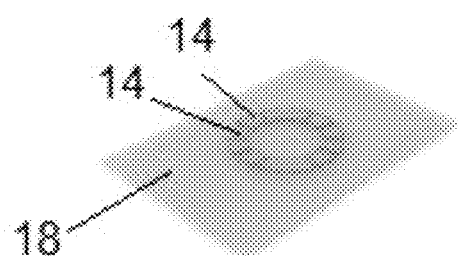
Figure 25:
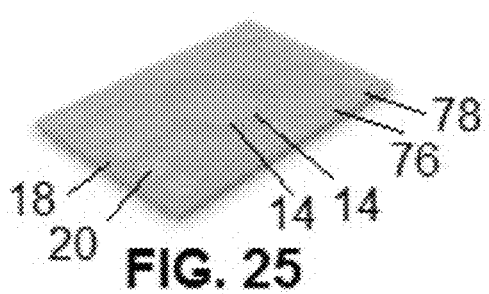
Figure 23:
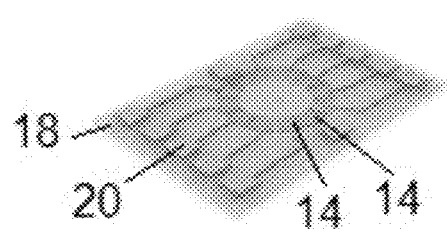
Figure 26:
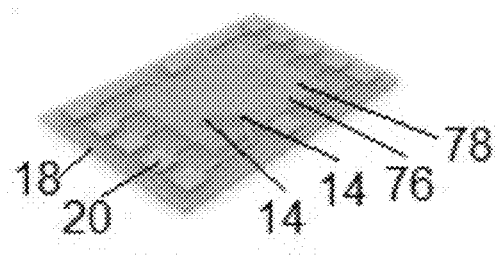
Figure 27:
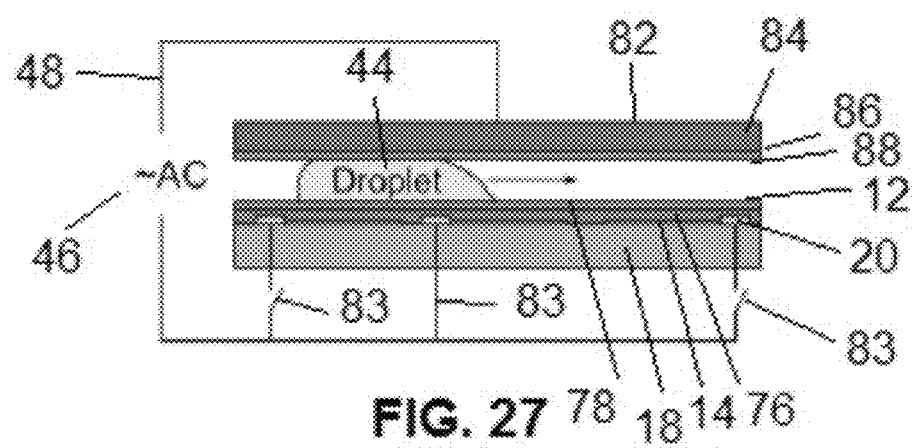
FIG. 27 illustrates a side view of part of the completed EWOD device formed by the process of FIGS. 21-26.
Figure 28:
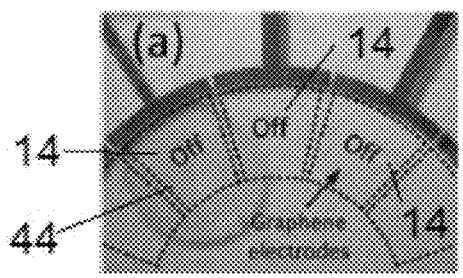
FIGS. 28-33 illustrate a top view of an EWOD device used for manipulating movement of a liquid droplet in a circular pattern.
Figure 29:
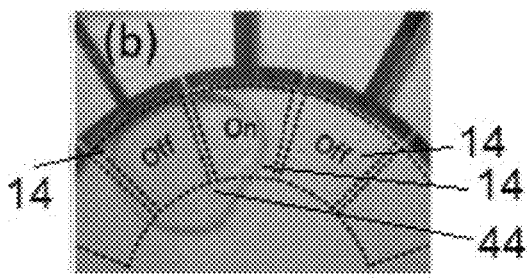
Figure 30:
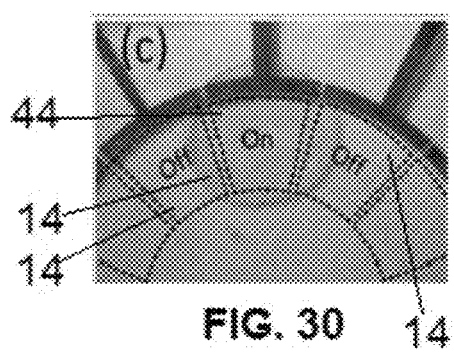
Figure 31:
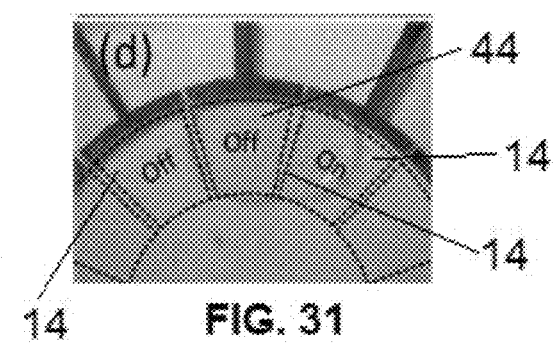
Figure 32:
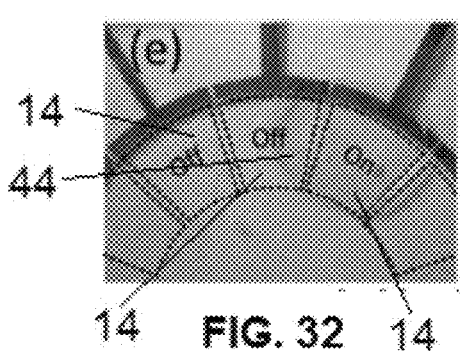
Figure 33:
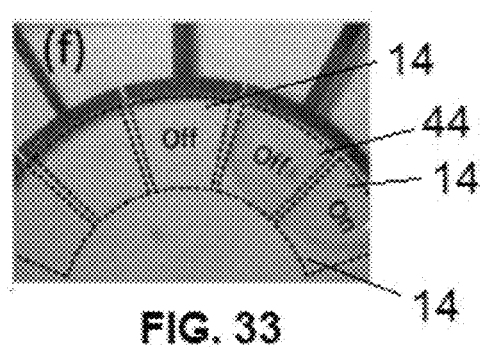

FIGS. 21-26 illustrate perspective views of a fabrication process of an EWOD device 10 having multiple spaced apart graphene electrodes, and FIG. 27 illustrates a side view of part of the completed EWOD device 10 formed by the process of FIGS. 21-26. The EWOD device 10 of FIGS. 21-27 may be similar to the EWOD devices 10 previously discussed, although the graphene 14 electrodes are shown here defined as spaced apart electrodes in a circular pattern and which can be used to move droplets for digital microfluidics. In FIG. 21, the graphene 14 may first be transferred onto a glass slide using the method of FIG. 3 up to block 30. Then, in FIG. 22, photolithography and oxygen plasma may be used to pattern the graphene 14 into individual graphene electrodes 14 in a circular pattern. During this step, 1 min oxygen plasma with 30 sccm O2 under 100 W may be used to etch the graphene electrodes. After graphene etching, the photoresist may be removed by acetone and baked at 115° C. for 1 min. In FIG. 23, the Ti/Au contact electrodes 20 may then be defined using a lift-off technique. In FIG. 24, after photolithography and e-beam evaporation, the substrate 18 (e.g. glass slide or PET film) may be coated with 1 μm Parylene C 78. In FIG. 25, a thin layer of Teflon 76 may be spin-coated on top as a hydrophobic dielectric layer 76. In FIG. 26, dielectric layers 16 (including the Parylene C 78 and Teflon 76) on the Ti/Au contact electrodes may be removed. In FIG. 27, a top electrode 82 is provided as an ITO glass 84 coated with Parylene C 86 and Teflon 88. The two electrode plates 12 and 82 may be separated using a double-sided scotch tape with a gap about 100 µm. A 1.5 µL KCl droplet 44 may be introduced into the central area of the electrode with a pipette. The electrodes may be wire-bonded to a circuit board connected by a programmable logic controller (PLC) controlled sequential switch and a power amplifier through an electrical path 48. The driving voltage of AC 70 V 1 kHz to move droplets is provided by an AC power source 46. The droplet movement may be manipulated a sequential switching voltage controlled by the PLC relay array. As shown, the AC power source 46 and electrical path 48 may be connected in parallel with each of the graphene electrodes 14. Each respective part of the electrical path 48 corresponding to each electrode 14 may have switch 83.

FIGS. 28-33 illustrate a top view of an EWOD device 10 used for manipulating movement of a KCl liquid droplet 44 in a circular pattern using a sequential switching voltage controlled by the PLC relay array. The transparent graphene electrodes may be separated by 50 µm and each may be connected to a respective Ti/Au electrode (e.g. contact pad 20) at one end. When the voltage is applied on one graphene electrode 14, the droplet may move toward the Ti/Au edges first. Further movement of droplets to cover the graphene electrode 14 may be observed by applying the voltage for about 5 seconds before the next graphene electrode 14 is switched on. In FIGS. 27-30, the droplet 44 is shown moving from the left to right side as a voltage is sequentially applied to the electrodes 14 in a pattern of off-off-off, off-on-off, and off-off-on, with the droplet moving toward the electrode 14 that is on. The actuation may require 1 kHz 70 V AC voltage to drive the liquid droplets. Thus, liquid droplet movements may be manipulated using graphene-based EWOD, for example flat glass substrates or curved bendable substrates (e.g. PET films) because of the mechanical flexibility of graphene.

Figure 34:
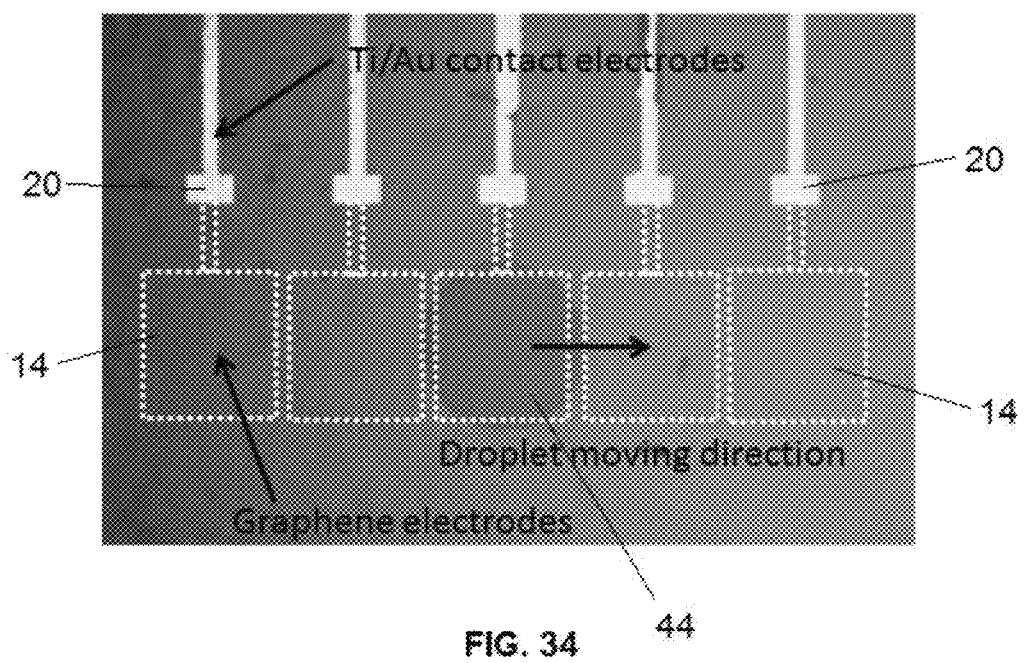
FIG. 34 illustrates a top view of an EWOD device used for manipulating movement of a liquid droplet in a linear pattern.

Although a circular pattern of graphene electrodes 14 are shown in FIGS. 20-32, other patterns can be defined depending on the particular application or path desired for droplet movement (e.g. in digital microfluidics). For example, FIG. 34 illustrates a top view of an EWOD device 10 having a series of linearly spaced apart graphene electrodes 14 used for manipulating movement of a KCl liquid droplet 44 in a linear pattern rather than a circular pattern.

In all of the previous embodiments, graphene 14 may also be used as a sensor, because graphene may be a semiconducting material and because graphene has high electrokinetics. The graphene 14 can detect or be used to detect a number of properties, including conductance changes (e.g. field effect sensors) for example in proteins or enzymes, and electrochemical changes (e.g. oxidation or reduction in a droplet 44, or measuring pH of a water droplet). The embodiments shown above with the dielectric layer 16 disposed above the graphene 14 may be able to perform sensing, because of nerve conduction through the dielectric layer 16. In other embodiments, part of the graphene 14 may be exposed to a droplet 44. For example a center portion of the graphene 14 electrode may be exposed, while the surrounding area of the graphene 14 may be coated with the dielectric layer 16.

Applications of EWOD using graphene may include display technology, optics (e.g. in camera lenses, optical apertures, and irises), chemistry (e.g. micro-particle synthesis, synchronized synthesis of ring-opened peptide products, and metal-organic framework crystal arrays synthesized by DMF), biology (sequencing, fluorescence detection, immunoassay, and cell culture), medicine (glucose assays perform, extracting and purifying estrogen from tissue, blood, or serum, processing of dried blood spots, and multiplexing of enzyme analyses of DBS extracts).

As a person skilled in the art will readily appreciate, the above description is meant as an illustration of implementation of the principles of this invention. This description is not intended to limit the scope or application of this invention in that the invention is susceptible to modification, variation and change, without departing from the spirit of this invention, as defined in the following claims.

What is claimed is:

1. A method of electrowetting, the method comprising:
    providing an electrode, the electrode comprising:
        a graphene layer having a first side and a second side, the second side opposing the first side; and
        a dielectric layer disposed on the first side of the graphene layer;
    providing a liquid droplet on the dielectric layer; and
    applying a voltage through the droplet and the electrode, wherein a contact angle between the dielectric layer and an edge of the liquid droplet contacting the dielectric layer changes in response to the applied voltage.

2. The method of claim 1 wherein the dielectric layer comprises a Teflon layer.

3. The method of claim 2 wherein the dielectric layer further comprises a Parylene C layer having a first side and a second side, the first side of the Parylene C layer disposed on the dielectric first side of the graphene layer, the second side of the Parylene C layer disposed on the Teflon layer.

4. The method of claim 1 further comprising a substrate layer disposed on the second side of the graphene layer.

5. The method of claim 4 wherein the substrate layer comprises polyethylene terephthalate.

6. The method of claim 4 wherein the substrate layer comprises glass.

7. The method of claim 1 wherein the electrode further comprises at least one contact pad in contact with one or both of the graphene layer and the dielectric layer.

8. The method of claim 1 wherein the contact pad comprises gold.

9. The method of claim 1 further comprising sensing, by the electrode, a property of the liquid droplet.

10. The method of claim 9 wherein the sensed property is a change in conductance of the liquid droplet.

11. The method of claim 9 wherein the sensed property is an electrochemical change of the liquid droplet.

12. An electrowetting device comprising:
    an electrode comprising:
        a graphene layer having a first side and a second side that opposes the first side; and
        a dielectric layer disposed on the first side of the graphene layer, the dielectric layer configured to allow a liquid droplet to be disposed thereon; and
    wherein the electrowetting device is configured to cause a change in a contact angle between the dielectric layer and an edge of the liquid droplet contacting the dielectric layer in response to a voltage applied through the droplet and the electrode.

13. The electrowetting device of claim 12 wherein the dielectric layer comprises a Teflon layer.

14. The electrowetting device of claim 13 wherein the dielectric layer further comprises a Parylene C layer having a first side and a second side, the first side of the Parylene C layer disposed on the dielectric first side of the graphene layer, the second side of the Parylene C layer disposed on the Teflon layer.

15. The electrowetting device of claim 12 further comprising a substrate layer disposed on the second side of the graphene layer.

16. The electrowetting device of claim 15 wherein the substrate layer comprises polyethylene terephthalate.

17. The electrowetting device of claim 15 wherein the substrate layer comprises glass.

18. The electrowetting device of claim 12 wherein the electrode further comprises at least one contact pad in contact with one or both of the a graphene layer and the dielectric layer.

19. The electrowetting device of claim 12 wherein the contact pad comprises gold.

20. The electrowetting device of claim 12 wherein the electrode is configured to sense a property of the liquid droplet.

21. The electrowetting device of claim 20 wherein the property is a change in conductance of the liquid droplet.

22. The electrowetting device of claim 20 wherein the property is an electrochemical change of the liquid droplet.

23. An electrowetting device comprising:
   a first graphene electrode having a first side and a second side that opposes the first side; and
   a second graphene electrode having a first side and a second side that opposes the first side, the second graphene electrode being spaced apart from the first graphene electrode; and
   a dielectric layer disposed on the first sides of the first and second graphene electrodes, the dielectric layer configured to allow a liquid droplet to be disposed thereon; and
   wherein the electrowetting device is configured to cause a change in a contact angle between the dielectric layer and an edge of the liquid droplet contacting the dielectric layer in response to a voltage applied through the droplet and one or both of the first or second electrodes.

\* \* \* \* \*